US010715524B1

(12) United States Patent
Paulus et al.

(10) Patent No.: US 10,715,524 B1
(45) Date of Patent: Jul. 14, 2020

(54) EXTERNAL CREDENTIAL-LESS STAGES FOR DATA WAREHOUSE INTEGRATIONS

(71) Applicant: Snowflake Inc., San Mateo, CA (US)

(72) Inventors: Polita Paulus, Kirkland, WA (US); Peter Povinec, Redwood City, CA (US); Saurin Shah, Kirkland, WA (US); Srinidhi Karthik Bisthavalli Srinivasa, Seattle, WA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/683,641

(22) Filed: Nov. 14, 2019

(51) Int. Cl.
*H04L 29/06* (2006.01)
*G06F 16/25* (2019.01)

(52) U.S. Cl.
CPC ........ *H04L 63/0884* (2013.01); *G06F 16/254* (2019.01); *H04L 63/107* (2013.01); *H04L 63/126* (2013.01); *H04L 2463/081* (2013.01)

(58) Field of Classification Search
CPC . H04L 63/0884; H04L 63/107; H04L 63/126; H04L 2463/081; G06F 16/254
See application file for complete search history.

(56) References Cited

U.S. PATENT DOCUMENTS

| 8,176,283 | B1* | 5/2012 | Hanson | G06F 12/14 |
| | | | | 380/264 |
| 2003/0225765 | A1* | 12/2003 | Frieden | G06F 21/31 |
| 2005/0108206 | A1* | 5/2005 | Lam | G06F 16/188 |
| 2010/0333116 | A1* | 12/2010 | Prahlad | G06F 3/0649 |
| | | | | 719/328 |
| 2011/0289314 | A1* | 11/2011 | Whitcomb | H04L 9/085 |
| | | | | 713/155 |
| 2014/0143543 | A1* | 5/2014 | Aikas | H04L 67/1097 |
| | | | | 713/168 |
| 2016/0234209 | A1* | 8/2016 | Kahol | H04L 63/08 |
| 2017/0208043 | A1* | 7/2017 | Bohli | G06F 3/0608 |

OTHER PUBLICATIONS

Ye, Xinfeng, Access Control for Cloud Applications, IEEE 12th Intl Conference on Ubiquitous Intelligence and Computing and IEEE 12th Intl Conference on Autonomic and Trusted Computing, Aug. 2015, pp. 970-977 (Year: 2015).*

* cited by examiner

Primary Examiner — Kenneth W Chang
(74) Attorney, Agent, or Firm — Schwegman Lundberg & Woessner, P.A.

(57) ABSTRACT

A storage integration object is created in a database of a data warehouse system. The storage integration object identifies a storage location in a storage platform of a cloud storage provider system and a cloud identity object maintained by a network-based data warehouse system. The cloud identity object is associated, at the storage platform of the cloud storage provider, with a proxy identity object granted permission to access the storage location. An external stage object is created based on the storage integration object. The external stage object identifies the storage location and includes an association with the storage integration object. A command to load or unload data at the storage location is received. In response to the command, the data is loaded or unloaded, via the proxy identity object, at the storage location using the external stage object.

25 Claims, 8 Drawing Sheets

US 10,715,524 B1

EXTERNAL CREDENTIAL-LESS STAGES FOR DATA WAREHOUSE INTEGRATIONS

TECHNICAL FIELD

Embodiments of the disclosure relate generally to a network-based data warehouse and, more specifically, to external credential-less stages for data warehouse storage integrations.

BACKGROUND

A cloud data warehouse (also referred to as a "network-based data warehouse" or simply as a "data warehouse") is a network-based system used for data analysis and reporting that comprises a central repository of integrated data from one or more disparate sources. A cloud data warehouse can store current and historical data that can be used for creating analytical reports for an enterprise. To this end, data warehouses typically provide business intelligence tools, tools to extract, transform, and load data into the repository, and tools to manage and retrieve metadata.

External stages are components within a cloud data warehouse that facilitate integrations between a cloud data warehouse system and a customer-managed storage location (referred to herein as "storage integrations"). In general, external stages are used to load data to and unload data from customer-managed storage locations. In conventional implementations, external stages must be provided with secret security credentials to read data from and write data to these storage locations. However, the exchange of the secret security credentials creates vulnerabilities that may lead to exposure of the secret security credentials, which may lead to unauthorized access of data. Additionally, in conventional implementations, cloud data warehouse account administrators have limited ability to prohibit creation of external stages by members in an organization, and an external stage could potentially be used to exfiltrate confidential data to a personal location. Further, storage owners do not have fine-grained control over access permissions for the storage locations. Conventional external stages are also limited to use in a single file path and are not able to be used in another file path, even if the credentials used to create the external stage are applicable to the other file path.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
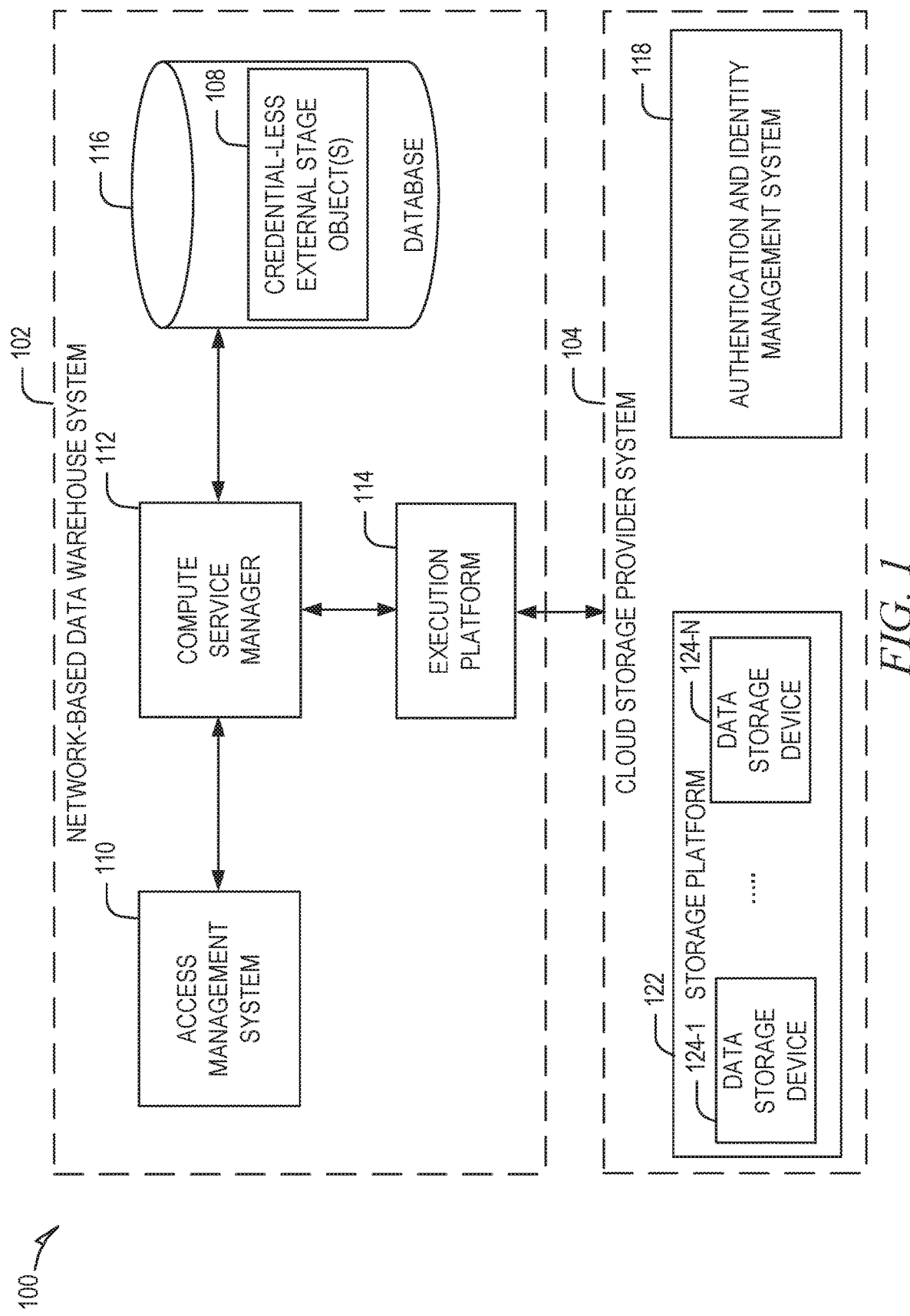
FIG. 1 illustrates an example computing environment that includes a network-based data warehouse system in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, external stages are used in network-based data warehouses to load data to and unload data from customer-managed storage locations, and conventional external stages must be provided with secret security credentials to enable access to these storage locations, which can create security vulnerabilities for the data. Aspects of the present disclosure address the above and other deficiencies of prior data warehouse functionality by creating credential-less external stage objects that do not require users to share secret security credentials with a network-based data warehouse to facilitate loading and unloading of data at storage locations in external cloud storage provider systems. The credential-less external state objects described herein also allow client account administrators to prevent data exfiltration through fine-grained control of access permissions.

Consistent with some embodiments, a network-based data warehouse creates an integration object comprising an identifier of a storage location (e.g., a universal resource locator (URL)) in a storage platform of an external cloud storage provider system (e.g., Amazon Web Services® (AWS), Microsoft Azure Blob Storage®, or Google Cloud Storage) to which the network-based data warehouse is to be provided access to load and unload data. The integration object further comprises an identifier of a proxy identity object maintained by the external cloud storage provider system. Once created, the network-based data warehouse associates the integration object with a cloud identity object that the cloud storage provider system associates with the proxy identity object. The proxy identity object defines a proxy identity that is granted access to the storage location and may be assumed by the cloud identity object to load and unload data at the storage location.

The data warehouse creates the integration object based on a command to create the storage integration. The command can be provided, for example, by an administrative user of a client account the data warehouse. The cloud identity object that is associated with the integration object corresponds to the client account to which the user belongs. A storage integration definition comprises the identifier of the storage location, the identifier of the proxy identity object, and an identifier of the cloud storage provider system. The storage integration definition can, in some instances, further specify one or more storage locations to which access is permitted or denied. The storage definition object can specify certain segments within the storage location to which access is denied. For example, the storage location can be identified by a file path that corresponds to a storage resource within the storage platform such as a bucket or folder, and the command may specify a sub-folder within the file path to which access is denied. In another example, the command may specify one or more file paths to which access is permitted and in this example, access to all other file paths will be denied by default.

The data warehouse creates an external stage object based on the storage integration object to load or unload data at the storage location. The external stage object comprises the identifier of the storage location and an identifier of the storage integration object. The data warehouse creates the external stage object based on a command to create the external stage object provided, for example, by the user that provided the storage integration definition.

The network-based data warehouse can receive a command to load or unload data at the storage location. The command comprises an identifier of the external stage object. In response to the command, the data warehouse utilizes the external stage object to load or unload data at the storage location in the storage platform of the external cloud storage provider. In doing so, the network-based data warehouse uses security credentials associated with the cloud identity object to access credentials to allow the cloud identity object to assume the proxy identity to load or unload the data. In this manner, the external stage object enables data to be loaded or unloaded at the storage location without exchanging security credentials associated with the storage location or storing the security credentials associated with the storage location with network-based data warehouse system.

Credential-less external stage objects, as described herein, separate the process of giving permissions to a storage location from the usage of that storage location to load and unload data. Credential-less external stage objects also allow organizations to give permissions to a network-based data warehouse to use their data locations instead of giving secret credentials to the data warehouse. Organizations can specify what roles may create and use storage locations for access separately from who may create and use stages set up in advance. For instance, an organization may allow account administrators to create a connection to a storage location and because only the account administrators can create storage integrations, additional storage integrations cannot be created to export data to thereby prevent confidential data exfiltration to unknown locations. Once created, non-administrative users can be granted permissions to read and write from fixed storage locations into an external stage object they create. A lower privilege user may only have the ability to use an existing stage.

Users with permissions to create a storage integration can control what paths under a base location can be accessed using that integration. Giving account administrators the ability to specify which users may create and use storage integrations allow an organization to control where their internal data may flow to, or completely lock down data export altogether.

External credential-less stage objects also provide the benefit of allowing access permissions to storage to be managed by the cloud storage provider thereby allowing organizations utilizing the data warehouse to leverage from their storage provider to manage data access by the network-based data warehouse. If an account administrator decides to revoke access by the data warehouse to a storage location, it can be done immediately using the access controls provided by the storage provider.

FIG. 1 illustrates an example computing environment 100 that includes a network-based data warehouse system 102 in communication with a cloud storage provider system 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the network-based data warehouse system 102 and a cloud storage provider system 104 (e.g., AWS®, Microsoft Azure Blob Storage®, or Google Cloud Storage). The network-based data warehouse system 102 is a network-based system used for reporting and analysis of integrated data from one or more disparate sources including one or more storage locations within the cloud storage provider system 104. The cloud storage provider system 104 comprises a plurality of computing machines and provides on-demand computer system resources such as data storage and computing power to the network-based data warehouse system 102.

The network-based data warehouse system 102 comprises an access management system 110, a compute service manager 112, an execution platform 114, and a database 116. The network-based data warehouse system 102 hosts and provides data reporting and analysis services to multiple client accounts. The access management system 110 enables administrative users of client accounts to manage access to resources and services provided by the network-based data warehouse system 102. Administrative users can create and manage identities (e.g., users, roles, and groups) and use permissions to allow or deny access to the identities to resources and services.

The compute service manager 112 coordinates and manages operations of the network-based data warehouse system 102. The compute service manager 112 also performs query optimization and compilation as well as managing clusters of computing services that provide compute resources (also referred to as "virtual warehouses"). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the data stored the computing environment 100. The database 116 stores data pertaining to various functions and aspects associated with the network-based data warehouse system 102 and its users. For example, the database 116 stores one or more credential-less external stage objects 108. In general, an external stage object 108 specifies a storage location (e.g., a URL) where data files are stored so that the data in the files can be loaded into a table stored internally by the data warehouse 102 or so that data from a table can be unloaded into the data files stored internally by the data warehouse 102. The one or more credential-less external stage objects 108 enable the network-based data warehouse system 102 to access storage locations within the cloud storage provider system 104 without storing, using, or otherwise accessing security credentials associated with the storage locations.

In some embodiments, the database 116 includes a summary of data stored in remote data storage systems as well as data available from a local cache. Additionally, the database 116 may include information regarding how data is organized in remote data storage systems (e.g., the cloud storage provider system 104) and the local caches. The database 116 allows systems and services to determine whether a piece of data needs to be accessed without loading or accessing the actual data from a storage device.

The compute service manager 112 is further coupled to the execution platform 114, which provides multiple computing resources that execute various data storage and data retrieval tasks. The execution platform 114 is coupled to storage platform 122 of the cloud storage provider system 104. The storage platform 122 comprises multiple data storage devices 124-1 to 124-N. In some embodiments, the data storage devices 124-1 to 124-N are cloud-based storage devices located in one or more geographic locations. For example, the data storage devices 124-1 to 124-N may be part of a public cloud infrastructure or a private cloud infrastructure. The data storage devices 124-1 to 124-N may be hard disk drives (HDDs), solid state drives (SSDs), storage clusters, Amazon S3™ storage systems or any other data storage technology. Additionally, the cloud storage provider system 104 may include distributed file systems (such as Hadoop Distributed File Systems (HDFS)), object storage systems, and the like.

The execution platform 114 comprises a plurality of compute nodes. A set of processes on a compute node executes a query plan compiled by the compute service manager 112. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

In addition to the storage platform 122, the cloud storage provider system 104 also comprises an authentication and identity management system 118. The authentication and identity management system 118 allows users to create and manage identities (e.g., users, roles, and groups) and use permissions to allow or deny access of the identities to cloud services and resources. The access management system 110 of the network-based data warehouse system 102 and the authentication and identity management system 118 of the cloud storage provider system 104 can communicate and share information so as to enable access and management of resources and services shared by users of both the network-based data warehouse system 102 and the cloud storage provider system 104.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 124-1 to 124-N are decoupled from the computing resources associated with the execution platform 114. This architecture supports dynamic changes to the network-based data warehouse system 102 based on the changing data storage/retrieval needs as well as the changing needs of the users and systems. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 112, database 116, execution platform 114, storage platform 122, and authentication and identity management system 118 are shown in FIG. 1 as individual discrete components. However, each of the compute service manager 112, database 116, execution platform 114, storage platform 122, and authentication and identity management system 118 may be implemented as a distributed system (e.g., distributed across multiple systems/platforms at multiple geographic locations). Additionally, each of the compute service manager 112, database 116, execution platform 114, storage platform 122, and authentication and identity management system 118 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud storage provider system 104. It is desirable to retrieve as much data as possible from caches within the execution platform 114 because the retrieval speed is typically much faster than retrieving data from the cloud storage provider system 104.

As shown in FIG. 1, the computing environment 100 separates the execution platform 114 from the storage platform 122. In this arrangement, the processing resources and cache resources in the execution platform 114 operate independently of the data storage devices 124-1 to 124-n in the cloud storage provider system 104. Thus, the computing resources and cache resources are not restricted to specific data storage devices 124-1 to 124-n. Instead, all computing resources and all cache resources may retrieve data from, and store data to, any of the data storage resources in the cloud storage provider system 104.

Figure 2:
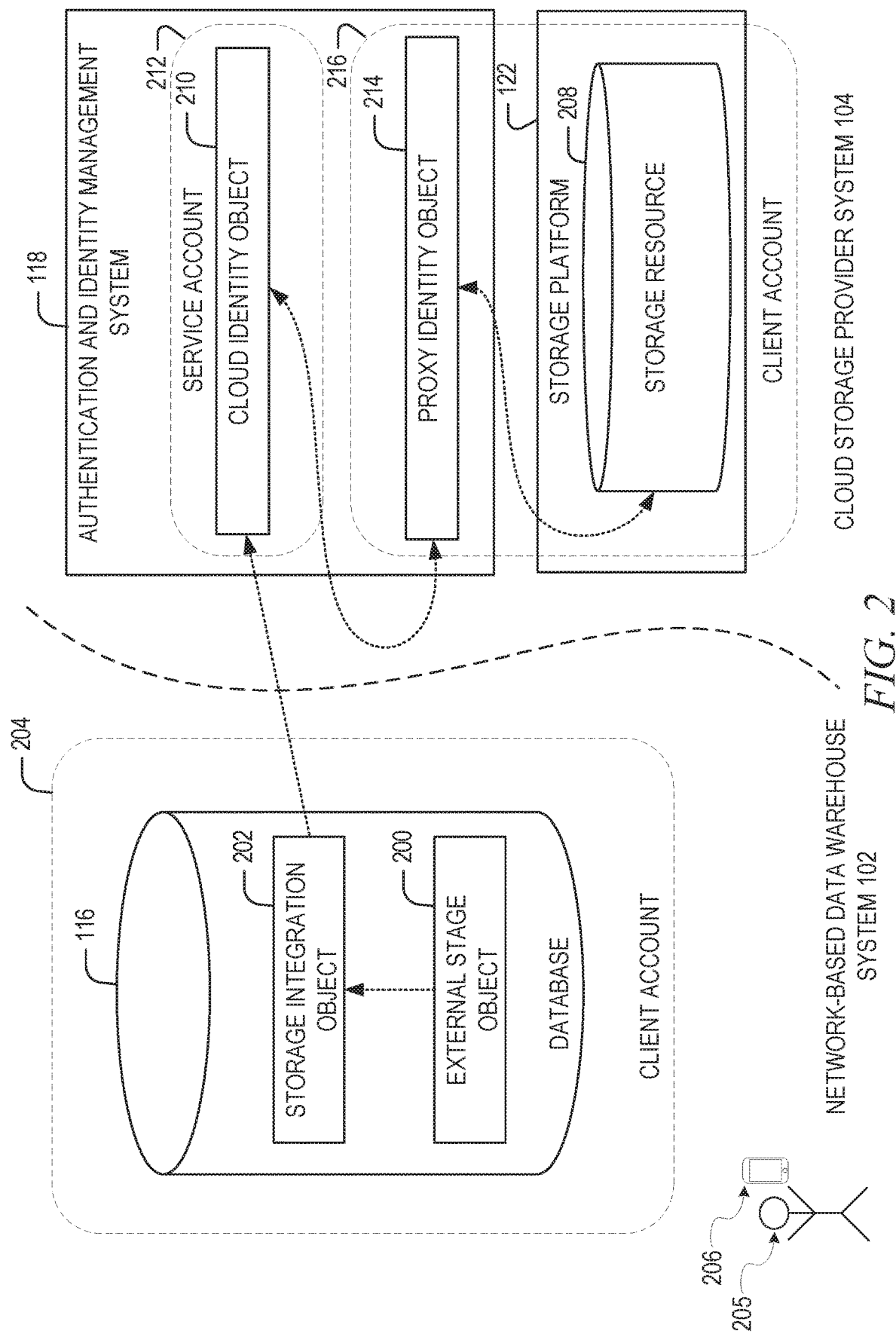
FIG. 2 is a data flow diagram illustrating use of an external credential-less stage object within the computing environment to load or unload data at a storage location within the cloud storage provider system to the network-based data warehouse system, in accordance with some embodiments of the present disclosure.

FIG. 2 is a data flow diagram illustrating use of an external stage object 200 within the computing environment 100, in accordance with some embodiments of the present disclosure. The external stage object 200 is an example of the credential-less external stage object(s) 108 illustrated in FIG. 1. The external stage object 200 is generated by the compute service manager 112 and stored in the database 116. The external stage object 200 is generated by the compute service manager 112 within a client account 204. The compute service manager 112 creates the external stage object 200 based on input received from a computing device in communication with the network-based data warehouse system 102. For example, a user 206 of the client account 204 can utilize a command line or other user interface provided to a computing device 206 by the network-based data warehouse system 102 to provide a command to create the external stage object 200.

The external stage object 200 is a component used to load or unload data at a storage location within the storage platform 122 to the network-based data warehouse system 102. In this particular example, the external stage object 200 specifies a storage location corresponding to a storage resource 208 within the storage platform 122 as a location from which data can be loaded or unloaded. The storage resource 208 resides on one or more of the storage devices 124-1 to 124-N of the storage platform 122. The external stage object 200 further comprises a reference (e.g., a pointer) to a storage integration object 202.

The storage integration object 202 is created within the client account 204 by the compute service manager 112 and is stored within the database 116. The compute service manager 112 creates the external stage object 200 based on input received from the computing device 206 of the user 205 of the client account 204 in communication with the network-based data warehouse system 102. For example, the user 206 can utilize the command line or other user interface provided to the computing device 206 by the network-based data warehouse system 102 to provide a command to create the storage integration object 202.

It shall be appreciated that the user who provides the command to create the external stage object 200 may be a different user from the user that provides the command to create the storage integration object 202. For example, a first user with administrator privileges—an administrative user—may provide the command to create the storage integration object 202 and as part of the command, may grant permission to a second user to use the storage integration object 202 to create external stage objects. In this example, the second user may provide the command to create the external stage object 200.

The storage integration object 202 defines a storage integration between the network-based data warehouse system 102 and an externally managed storage location in the storage platform 122. More specifically, the storage integration object 202 describes properties of a storage integration between the network-based data warehouse system 102 and the customer managed storage resource 208 (e.g., a folder, data bucket, or other storage resource). The storage integration object 202 comprises an identifier of a storage location corresponding to the storage resource 208 (e.g., a URL) and an identifier of the cloud storage provider system 104. In some embodiments, the storage integration object 202 may further specify one or more storage locations to which access to data is to be denied. For example, the external stage object 200 may identify a base storage location to which access is to be allowed using a file path and the storage integration object 202 may further identify a portion of the base storage location to which access is to be allowed or denied with a sub-path of the file path.

Once created, the compute service manager 112 associates the storage integration object 202 with a cloud identity object 210 within a service account 212 maintained by the authentication and identity management system 118 that is associated with the network-based data warehouse system 102 and the client account 204. The cloud identity object 210 is an identity within the cloud storage provider system 104 associated with the client account 204. The cloud identity object 210 may be created when the client account 204 is created. A unique identifier (e.g., an Amazon Resource Name (ARN)) is associated with the cloud identity object 210 at creation. A storage provider administrator can utilize the authentication and identity management system 118 to grant permission to the cloud identity object 210 to access storage using the identifier of the cloud identity object 210.

The compute service manager 112 may store cloud storage provider identity identifiers in the database 116 in an encrypted format. The compute service manager 112 may further store security credentials associated with each cloud storage provider identity in the database 116 in an encrypted format.

The cloud storage provider system 104 generates a proxy identity object 214 within a client account 216 of the cloud storage provider system 104. The client account 216 is the account of the client corresponding to the client account 204 within the cloud storage provider system 104. The cloud storage provider system 104 generates the proxy identity object 214 based on input specified by an administrative user of the client account 216. In some instances, the administrative user of the client account 216 is the user 205.

The proxy identity object 214 defines a proxy identity with an associated trust policy for making services requests within the cloud storage provider system 104. More specifically, the proxy identity object 214 includes a set of permissions that allow the cloud identity object 210 to assume the proxy identity to read data from and write data to the storage resource 208. Rather than being uniquely associated with a single person like a user, the proxy identity object 214 defines a proxy identity that can be assumed by multiple users.

In some instances, the proxy identity defined by the proxy identity object 214 does not have long-term security credentials, and in these instances, another identity that is assuming the proxy identity utilizes temporary security credentials provided by the authentication and identity management system 118 to access the proxy identity. Consistent with these embodiments, the temporary security credentials may expire after an expiration time.

The cloud storage provider system 104 assigns a unique identifier to the proxy identity object 214 (e.g., an Amazon, Resource Name (ARN)). The unique identifier of the proxy identity object 214 is used by the storage administrator to grant access to storage.

In response to receiving a command to load data from the storage location corresponding to the storage resource 208 to an internally managed storage resource (e.g., a table) or to unload data from the internally managed storage resource to the storage location corresponding to the storage resource 208, the network-based data warehouse system 102 uses the external stage object 200 to load or unload the data. In particular, the compute service manager 112 identifies and accesses the storage integration object 202 using the external stage object 200 and uses the storage integration object 202 to access security credentials associated with the cloud identity object 210. The compute service manager 112 uses security credentials associated with the cloud identity object 210 to access security credentials from the authentication and identity management system 118 to allow the cloud identity object 210 to assume the proxy identity defined by the proxy identity object 214 to load or unload data between the internal storage resource and the storage resource 208.

Figure 3:
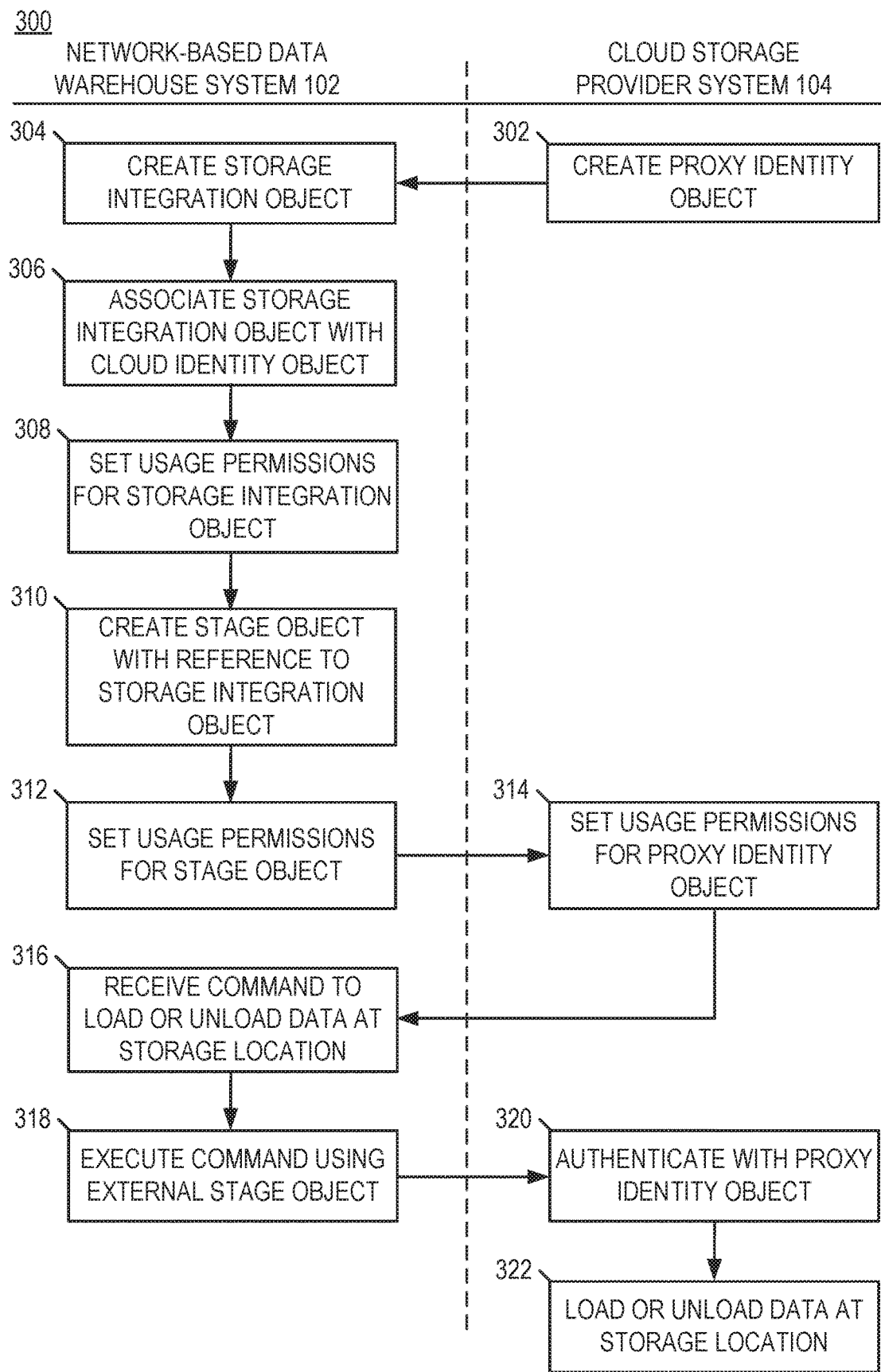
FIG. 3 is an interaction diagram illustrating interactions between components in the computing environment in loading or unloading data at a storage location within the cloud storage provider system to the network-based data warehouse system without exchanging security credentials associated with the storage location, in accordance with some embodiments of the present disclosure.

FIG. 3 is an interaction diagram illustrating interactions between the network-based data warehouse system 102 and the cloud storage provider system 104 in a method 300 for using the external stage object 200 to load or unload data at the storage resource 208 within the cloud storage provider system 104 to the network-based data warehouse system 102, in accordance with some embodiments of the present disclosure. For ease of explanation, the method 300 is described below with reference to the components illustrated in FIGS. 1 and 2 and described above.

At operation 302, the cloud storage provider system 104 creates the proxy identity object 214 within the client account 216. The cloud storage provider system 104 generates the proxy identity object 214 based on input specified by an administrative user of the client account 216. As noted above, the proxy identity object 214 includes a set of permissions that allow the cloud identity object 210 to assume the proxy identity to read data from and write data to the storage resource 208.

At operation 304, the compute service manager 112 of the network-based data warehouse system 102 creates the storage integration object 202 in the database 116. The compute service manager 112 creates the storage integration object 202 based on a command provided by a first user (e.g., the user 206) of the client account 204. The first user may be an administrative user of the client account 204. As noted above, the storage integration object 202 comprises: an integration name, an identifier of an externally managed storage location such as a URL corresponding to the storage resource 208; an identifier of the cloud storage provider system 104; and an identifier of the proxy identity object 214. In some embodiments, the storage integration object 200 may further specify one or more storage locations to which access to data is to be denied. The one or more storage locations to which access to data is to be denied may correspond to portions of the storage locations to which access to the network-based data warehouse system 102 is to be provided. For example, the external stage object 200 may identity a base storage location to which access is to be allowed using a file path and the storage integration object 200 may further identify a portion of the base storage location to which access is to be denied with a sub-path of the file path.

At operation 306, the compute service manager 112 associates the storage integration object 202 with the cloud identity object 210. The compute service manager 112 associates the storage integration object 202 with the cloud identity object 210 based on an association between the client account 204 and the cloud identity object 210.

At operation 308, the access management system 110 sets usage permissions for the storage integration object 202. The setting of usage permissions for the integration object may comprise granting a second user permission to use the storage integration object. In some embodiments, the access management system 110 may grant usage permission to an identity that corresponds to multiple users thereby providing usage permission to each user associated with the identity.

At operation 310, the compute service manager 112 creates the external stage object 200. The compute service manager 112 creates the external stage object 200 based on an external stage creation command to load or unload data at a storage location. The storage location may be the same as the storage location specified in the storage integration object 202 or may comprise a portion of the storage location specified in the storage integration object 202. The external stage object 200 comprises an identifier corresponding to the storage location (e.g., the URL corresponding to the storage location) and a reference to the storage integration object 202 (e.g., a pointer).

At operation 312, the access management system 110 sets usage permissions for the external stage object 200. The access management system 110 may set usage permissions based on input received from the second user. The setting of usage permissions for the integration object may comprise granting usage permission to a third identity. The third identity may correspond to a single user or may be associated with multiple users. Once usage permission is granted to the third identity, the one or more users associated with the third identity are allowed to use the external stage object to load or unload data.

At operation 314, a cloud storage provider administrator sets usage permission on the cloud storage provider system 104 for the proxy identity object. In setting the usage permissions for the proxy identity object, the cloud storage provider system 104 grants permission to the cloud identity object to use the proxy identity object to load and unload data at the storage location.

At operation 316, the compute service manager 112 receives a command to load data from the storage location to an internally managed storage resource (e.g., a table) or to unload data from the internally managed storage resource to the storage location. The command comprises the identifier of the external stage object 200 (e.g., the integration name). The command may be received from a computing device of a third user associated with the third identity. In response to the command, the compute service manager 112 uses the external stage object 200 to execute the command, at operation 318. In executing the command, the network-based data warehouse system 102 authenticates with the proxy identity object 214 using security credentials associated with the proxy identity object 214 to assume the proxy identity defined by the proxy identity object 214. The network-based data warehouse system 102 assumes the proxy identity object 214 to either load data from the storage location to an internally managed storage resource (e.g., a table) or to unload data from the internally managed storage resource to the storage location, at operation 322.

Figure 4:
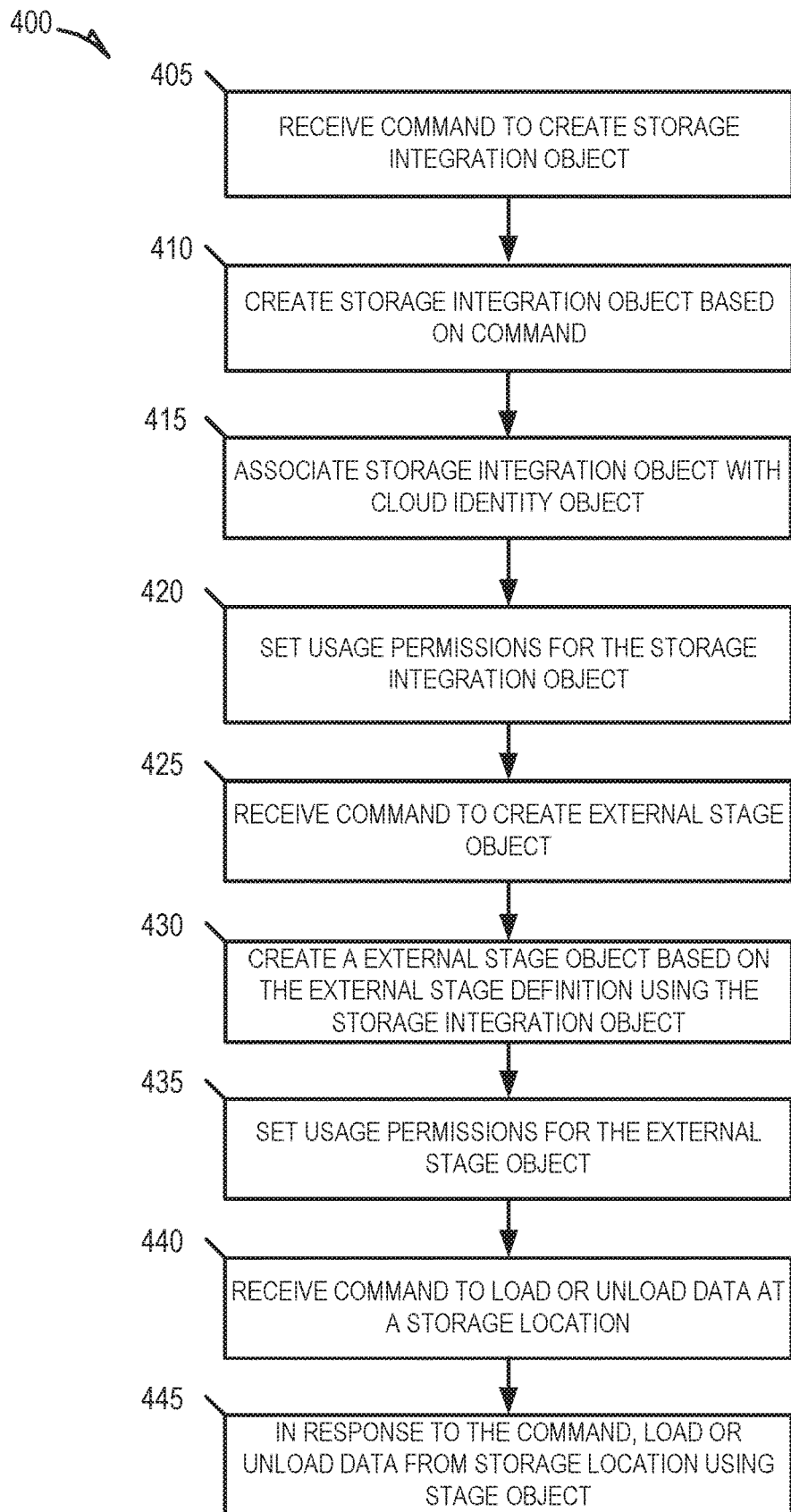
FIGS. 4 and 5 are flow diagrams illustrating operations of the network-based data warehouse in performing a method for loading or unloading data from an external storage platform using a credential-less external stage object, in accordance with some embodiments of the present disclosure.
Figure 5:
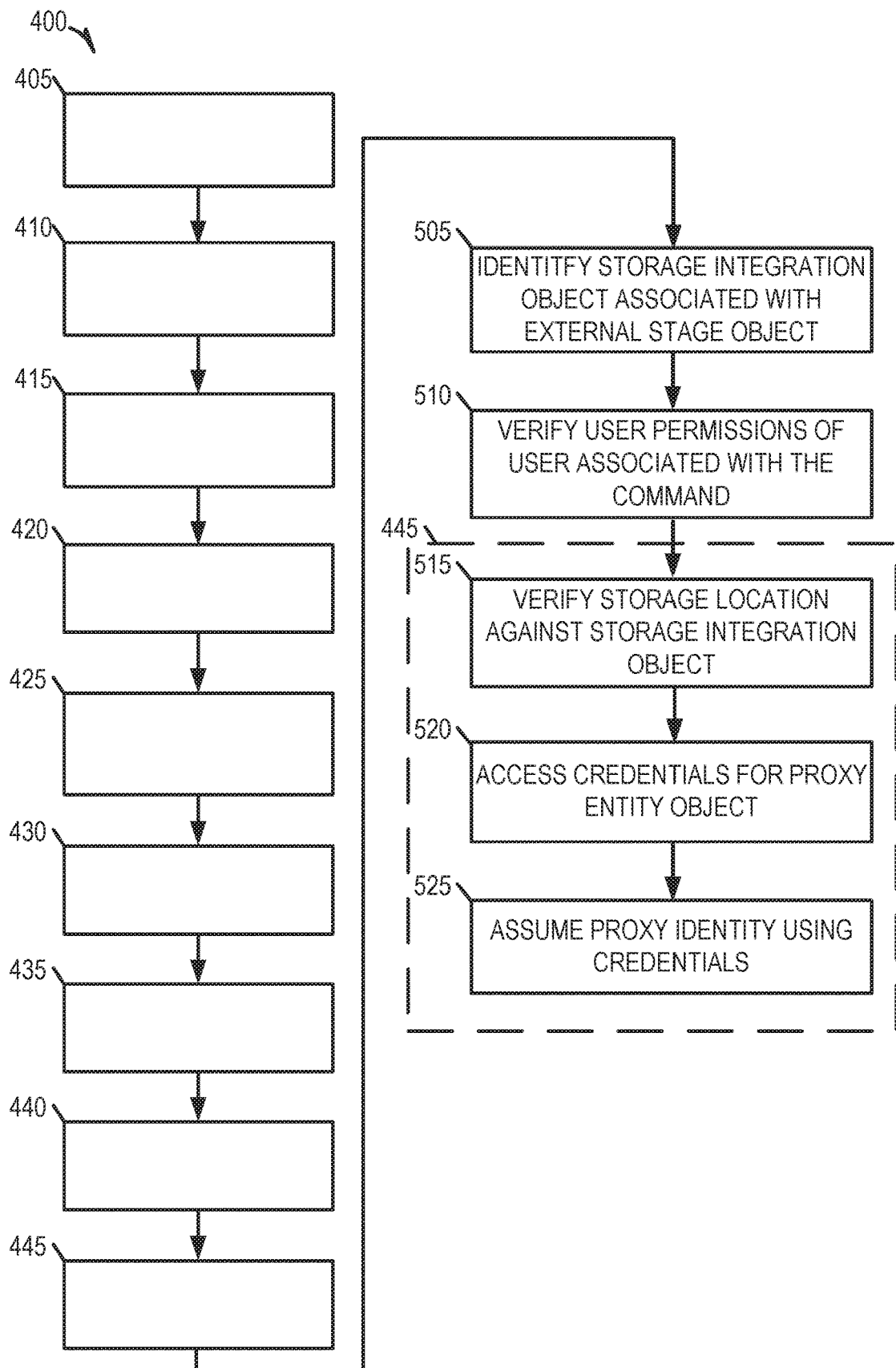

FIGS. 4 and 5 are flow diagrams illustrating operations of the network-based data warehouse system 102 in performing a method 400 for loading or unloading data from the storage platform 122 using the external stage object 200, in accordance with some embodiments of the present disclosure. The method 400 may be embodied in computer-readable instructions for execution by one or more hardware components (e.g., one or more processors) such that the operations of the method 400 may be performed by components of network-based data warehouse system 102. Accordingly, the method 400 is described below, by way of example with reference thereto. However, it shall be appreciated that the method 400 may be deployed on various other hardware configurations and is not intended to be limited to deployment within the network-based data warehouse system 102.

At operation 405, the compute service manager 112 receives a command to create a storage integration object (also referred to as a "storage integration creation command"). The storage integration creation command is received from a computing device in communication with the data warehouse 102 and is specified by a first user via a command line or UI provided to the computing device by the network-based data warehouse system 102. The first user is an administrative user belonging to a client account of the network-based data warehouse system 102. In general, the command specifies storage locations that are allowed or blocked as part of a storage integration. For example, the command can comprise an identifier corresponding to a first storage location (e.g., a URL) in the storage platform 122 of the cloud storage provider system 104 to which the network-based data warehouse is to be allowed access to load and unload data. The first storage location corresponds to a data storage resource such as a data folder or a data bucket. The storage integration creation command further specifies the cloud storage provider system 104, an integration name, and an identifier of a proxy identity object maintained by the cloud storage provider system 104. The proxy identity object defines a proxy identity that has associated permissions to access the first storage location. The proxy identity object further includes permissions that allow a cloud identity to assume the proxy identity to load and unload data at the first storage location.

In some instances, the first storage location may be a base storage location and the storage integration creation command can further specify one or more blocked storage locations to which access by the network-based data warehouse system 102 is denied. The blocked locations may correspond to one or more portions of the first storage location. For example, the first storage location may correspond to a storage bucket (e.g., an S3 storage bucket) and the storage integration creation command may specify one or more folders within the storage bucket to which access is to be denied.

At operation 410, the compute service manager 112 creates a storage integration object in the database 116 based on the storage integration creation command. The storage integration object specifies the first storage location (e.g., a URL), the cloud storage provider system 104, and the proxy identity object. More specifically, the storage integration object comprises a first identifier corresponding to the first storage location (e.g., a URL), an identifier of the cloud storage provider system 104, and an identifier of the proxy identity object (e.g., an ARN). Once created, the network-based data warehouse system 102, at operation 415, associates the integration object with a cloud identity object that is associated with the proxy identity object. The cloud identity object defines a cloud identity used to access cloud services provided by the cloud storage provider system 104. The cloud identity object is associated with the storage integration object based on an association between the cloud identity object and the client account to which the first user belongs.

At operation 420, the access management system 110 sets usage permissions for the storage integration object. The access management system 110 may set usage permissions based on input received from the first user. The setting of usage permissions for the integration object may comprise granting a second identity permission to use the storage integration object to create one or more external stage objects. In some embodiments, the second identity corresponds to at least a second user. In some embodiments, the access management system 110 may grant usage permission to an identity that corresponds to multiple users thereby providing usage permission to each user associated with the identity.

At operation 425, the compute service manager 112 receives a command to create an external stage object (also referred to as a "external stage creation command"). The external stage creation command is received from a computing device in communication with the data warehouse 102 and is specified by the second user via a command line or UI provided to the computing device by the network-based data warehouse system 102. The external stage creation command comprises an identifier of a second storage location (e.g., a URL) and an identifier of the storage integration object (e.g., the name of the storage integration object). In some instances, the second storage location may be the same as the first storage location while in other instances, the second storage location may correspond to a location within the first storage location. That is, the second storage location may correspond to a portion of the first storage location.

At operation 430, the compute service manager 112 creates an external stage object based on the external stage creation command to load or unload data at the second storage location. The external stage object identifies the second storage location and includes an association with the storage integration object. More specifically, the external stage object comprises the identifier of the second storage location (e.g., the URL corresponding to the second storage location) and a reference to the storage integration object (e.g., a pointer).

At operation 435, the access management system 110 sets usage permissions for the external stage object. The access management system 110 may set usage permissions based on input provided by the second user. The setting of usage permissions for the integration object may comprise granting usage permission to a third identity associated with at least a third user. Once usage permission is granted to the third identity, at least the third user is allowed to use the external stage object.

At operation 440, the compute service manager 112 receives a command to unload from an internal data resource (e.g., a table) to a third storage location or to load data from the third storage location to the internal data resource. The command comprises the identifier of the external stage object (e.g., the name given to the external stage object). The command may be received from a computing device of a third user. In response to the command, the compute service manager 112, at operation 445, loads or unloads the data at the third storage location in the storage platform 122 of the external cloud storage provider using the external stage object 200. In a first example, the compute service manager 112 copies data from the storage location to a table maintained in a storage location that is internal to the network-based data warehouse system 102. In a second example, the compute service manager 112 copies data from a table maintained in an internal storage location to the storage location specified in the command. The third storage location corresponds to the second storage location. For example, the third storage location may be the same as the second storage location or may correspond to a location within the second storage location.

As shown in FIG. 5, the method 400 may, in some embodiments, further include operations 505, 510, 515, 520, and 525. Consistent with these embodiments, the operations 505 and 510 may be performed subsequent to the operation 440 where compute service manager 112 receives the command to load or unload data at the storage location.

At operation 505, the compute service manager 112 identifies the storage integration object based on an association with the external stage object. For example, as noted above, the external stage object referenced in the command to load or unload data includes a reference to the integration object (e.g., a pointer).

At operation 510, the compute service manager 112 works in conjunction with the access management system 110 to verify user permissions associated with the third user. In verifying the user permissions associated with the third user, the compute service manager 112 verifies the third user has permission to use the external stage object and the storage integration object.

Consistent with these embodiments, the operations 515, 520, and 525 may be performed as part of operation 445 (e.g., as a sub-routine or sub-operations) where the compute service manager 112 loads or unloads data at the storage location.

At operation 515, the compute service manager 112 verifies that the third storage location is allowed by the storage integration object. That is, the compute service manager 112 checks the third storage location against the first storage location identified in the storage integration object to verify that the third storage location is within the first storage location. The service manager 112 may further check the third storage location against any blocked storage locations specified by the storage integration object to determine whether the third storage location is allowed by the storage integration object.

At operation 520, the compute service manager 112 accesses security credentials to be used in authenticating with the cloud storage provider system 104 to assume the proxy identity defined by the proxy identity object. In some embodiments, the security credentials are temporary and may expire after a time limit is reached (e.g., 1 hour) and may be limited in scope for use specifically in loading or unloading data at the first storage location.

Consistent with some embodiments, the compute service manager 112 may obtain the security credentials by transmitting a request to the authentication and identity management system 118 of the cloud storage provider system 104 for the security credentials. The request can comprise or indicate a first identifier corresponding to the cloud identity object, a second identifier corresponding to proxy identity object, and security credentials associated with the cloud identity object. The security credentials associated with the cloud identity object may be stored in an encrypted format in the database 116. The authentication and identity management system 118 of the cloud storage provider system 104 provides the security credentials in response to the request.

At operation 525, the compute service manager 112 causes the cloud identity to assume the proxy identity defined by the proxy identity object using the credentials obtained from the authentication and identity management system 118. That is, the cloud identity interacts with the storage location (e.g., by loading or unloading data) via the proxy identity and may exchange data with the compute service manager 112 using the proxy identity.

Figure 6:
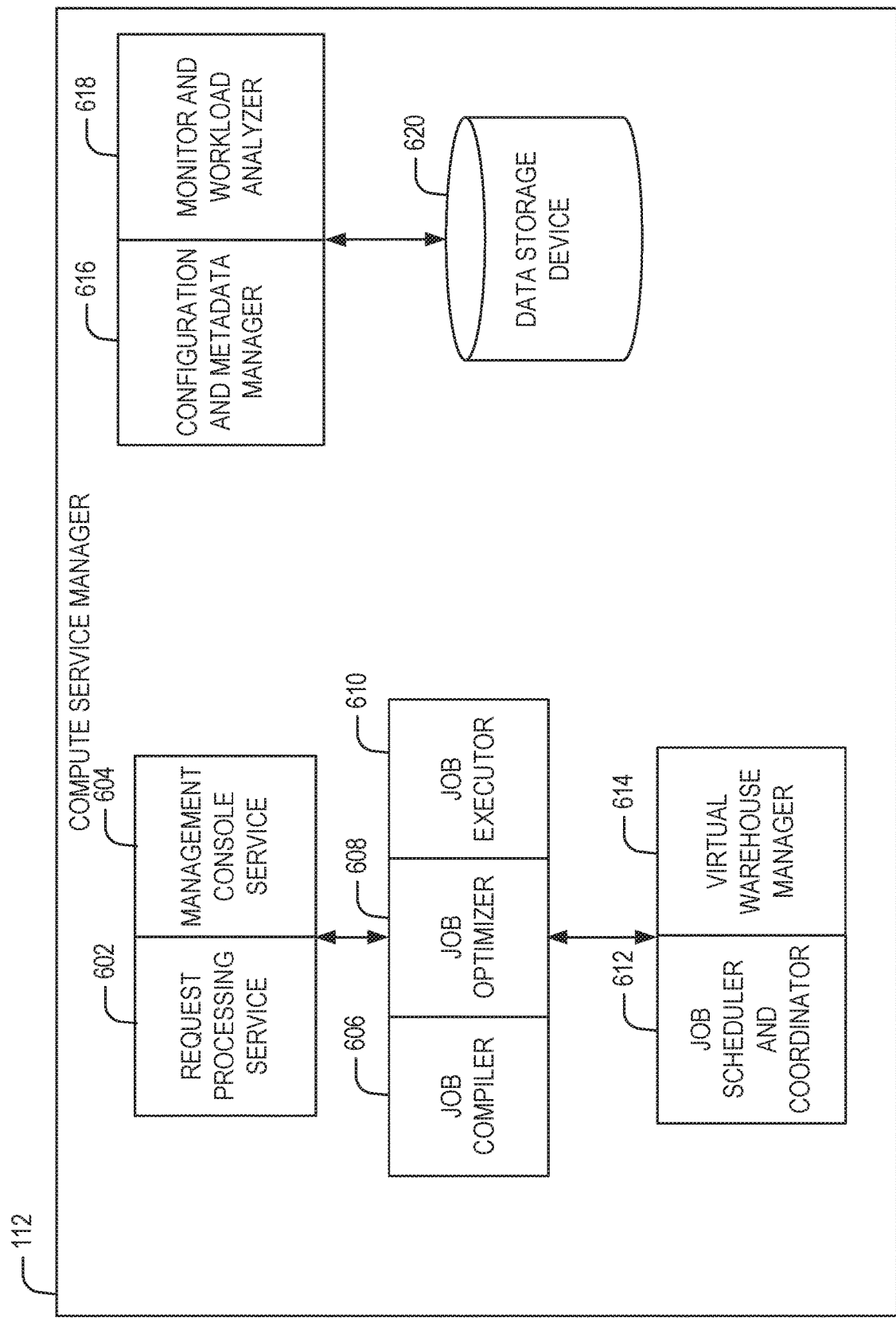
FIG. 6 is a block diagram illustrating components of a compute service manager, in accordance with some embodiments of the present disclosure.

FIG. 6 is a block diagram illustrating components of the compute service manager 112, in accordance with some embodiments of the present disclosure. As shown in FIG. 6, request processing service 602 manages received data storage requests and data retrieval requests (e.g., jobs to be performed on database data). For example, the request processing service 602 may determine the data necessary to process a received query (e.g., a data storage request or data retrieval request). The data may be stored in a cache within the execution platform 114 or in a data storage device in cloud storage provider system 104.

A management console service 604 supports access to various systems and processes by administrators and other system managers. Additionally, the management console service 604 may receive a request to execute a job and monitor the workload on the system.

The compute service manager 112 also includes a job compiler 606, a job optimizer 608 and a job executor 610. The job compiler 606 parses a job into multiple discrete tasks and generates the execution code for each of the multiple discrete tasks. The job optimizer 608 determines the best method to execute the multiple discrete tasks based on the data that needs to be processed. The job optimizer 608 also handles various data pruning operations and other data optimization techniques to improve the speed and efficiency of executing the job. The job executor 610 executes the execution code for jobs received from a queue or determined by the compute service manager 112.

A job scheduler and coordinator 612 sends received jobs to the appropriate services or systems for compilation, optimization, and dispatch to the execution platform 114. For example, jobs may be prioritized and processed in that prioritized order. In an embodiment, the job scheduler and coordinator 612 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 612 identifies or assigns particular nodes in the execution platform 114 to process particular tasks. A virtual warehouse manager 614 manages the operation of multiple virtual warehouses implemented in the execution platform 114. As discussed below, each virtual warehouse includes multiple execution nodes that each include a cache and a processor.

Additionally, the compute service manager 112 includes a configuration and metadata manager 616, which manages the information related to the data stored in the remote data storage devices and in the local caches (e.g., the caches in execution platform 114). The configuration and metadata manager 616 uses the metadata to determine which data micro-partitions need to be accessed to retrieve data for processing a particular task or job. A monitor and workload analyzer 618 oversee processes performed by the compute service manager 112 and manages the distribution of tasks (e.g., workload) across the virtual warehouses and execution nodes in the execution platform 114. The monitor and workload analyzer 618 also redistribute tasks, as needed, based on changing workloads throughout the data warehouse 102 and may further redistribute tasks based on a user (e.g., "external") query workload that may also be processed by the execution platform 114. The configuration and metadata manager 616 and the monitor and workload analyzer 618 are coupled to a data storage device 620. Data storage device 620 in FIG. 6 represent any data storage device within the data warehouse 102. For example, data storage device 620 may represent caches in execution platform 114, storage devices in cloud storage provider system 104, or any other storage device.

Figure 7:
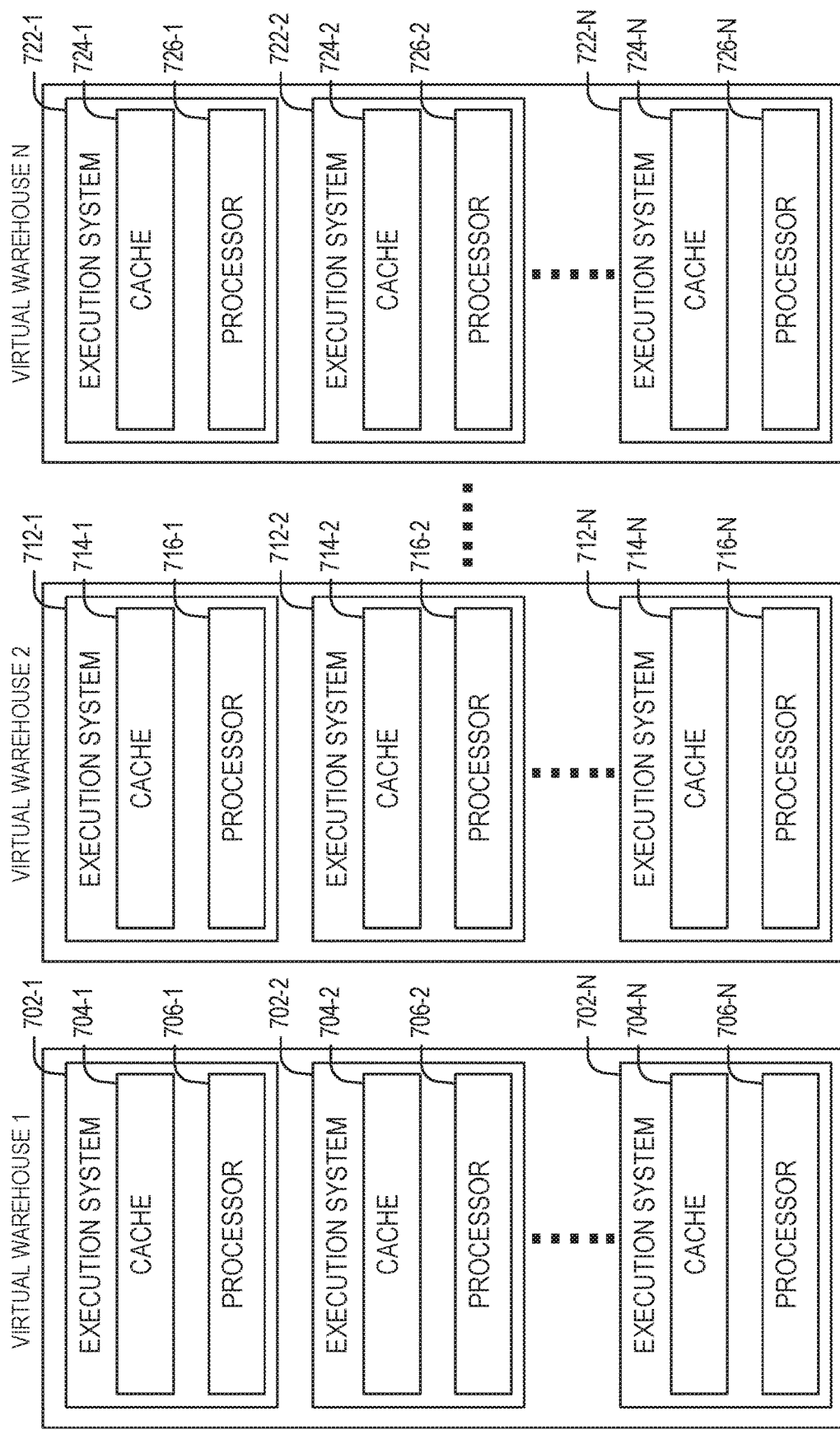
FIG. 7 is a block diagram illustrating components of an execution platform, in accordance with some embodiments of the present disclosure.

FIG. 7 is a block diagram illustrating components of the execution platform 114, in accordance with some embodiments of the present disclosure. As shown in FIG. 7, the execution platform 114 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 114 can add new virtual warehouses and drop existing virtual warehouses in real-time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud storage provider system 104).

Although each virtual warehouse shown in FIG. 7 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 124-1 to 124-$n$ shown in FIG. 1. Thus, the virtual warehouses are not necessarily assigned to a specific data storage device 124-1 to 124-$n$ and, instead, can access data from any of the data storage devices 124-1 to 124-$n$ within the cloud storage provider system 104. Similarly, each of the execution nodes shown in FIG. 7 can access data from any of the data storage devices 124-1 to 124-$n$. In some embodiments, a particular virtual warehouse or a particular execution node may be temporarily assigned to a specific data storage device, but the virtual warehouse or execution node may later access data from any other data storage device.

In the example of FIG. 7, virtual warehouse 1 includes three execution nodes 702-1, 702-2, and 702-$n$. Execution node 702-1 includes a cache 704-1 and a processor 706-1. Execution node 702-2 includes a cache 704-2 and a processor 706-2. Execution node 702-$n$ includes a cache 704-$n$ and a processor 706-$n$. Each execution node 702-1, 702-2, and 702-$n$ is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 712-1, 712-2, and 712-$n$. Execution node 712-1 includes a cache 714-1 and a processor 716-1. Execution node 712-2 includes a cache 714-2 and a processor 716-2. Execution node 712-$n$ includes a cache 714-$n$ and a processor 716-$n$. Additionally, virtual warehouse 3 includes three execution nodes 722-1, 722-2, and 722-$n$. Execution node 722-1 includes a cache 724-1 and a processor 726-1. Execution node 722-2 includes a cache 724-2 and a processor 726-2. Execution node 722-$n$ includes a cache 724-$n$ and a processor 726-$n$.

In some embodiments, the execution nodes shown in FIG. 7 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 7 each includes one data cache and one processor, alternate embodiments may include execution nodes containing any number of processors and any number of caches. Additionally, the caches may vary in size among the different execution nodes. The caches shown in FIG. 7 store, in the local execution node, data that was retrieved from one or more data storage devices in cloud storage provider system 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the cloud storage provider system 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 7 as having multiple execution nodes. The multiple execution nodes associated with each virtual warehouse may be implemented using multiple computing systems at multiple geographic locations. For example, an instance of virtual warehouse 1 implements execution nodes 702-1 and 702-2 on one computing platform at a geographic location and implements execution node 702-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage provider system 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 8:
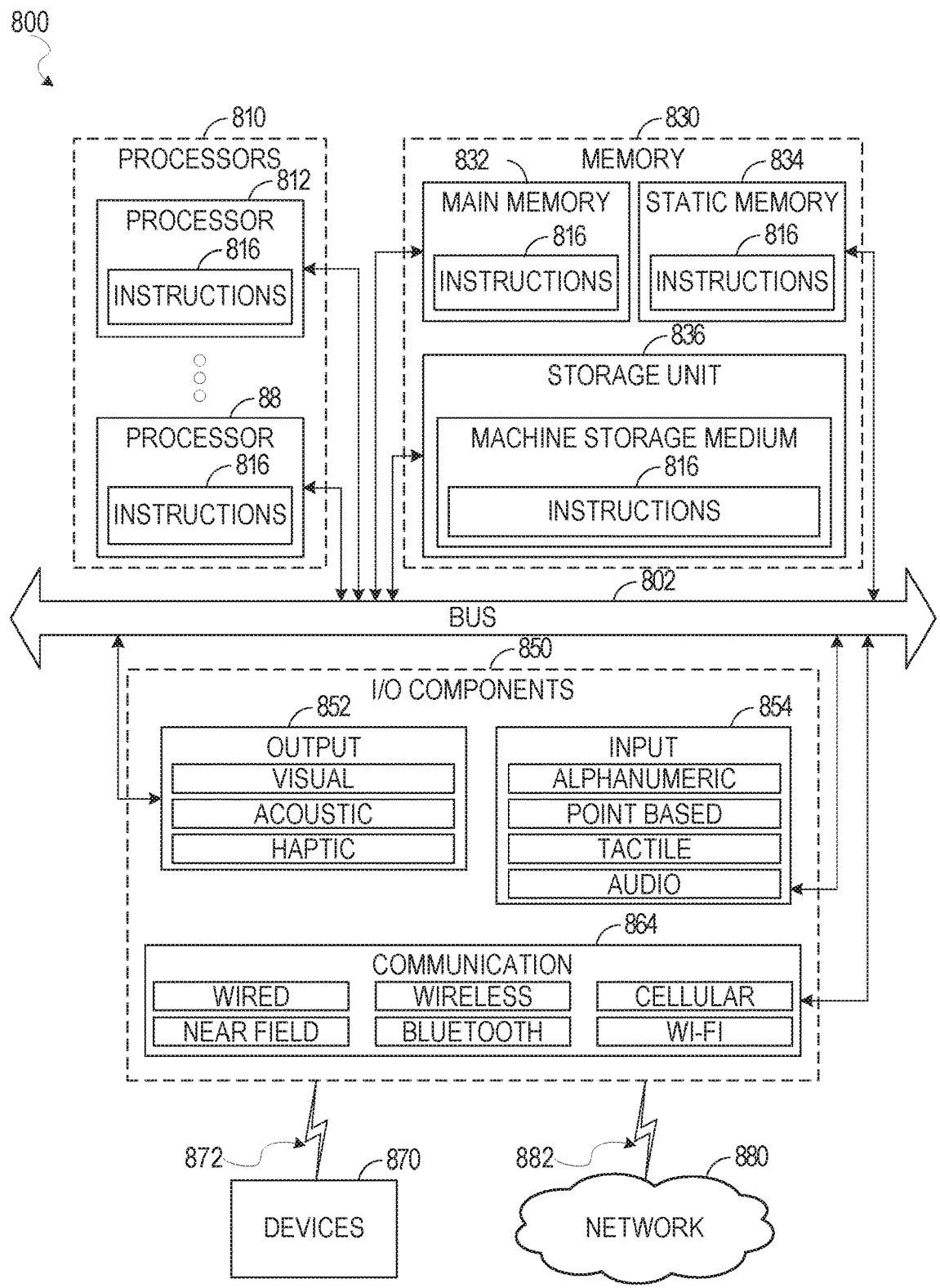
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the method 300 or 400. As another example, the instructions 816 may cause the machine 800 to implemented portions of the data flows illustrated in any one or more of FIGS. 3-5. In this way, the instructions 816 transform a general, non-programmed machine into a particular machine 800 (e.g., the access management system 110, the compute service manager 112, the execution platform 114, the authentication and identity management system 118, and the computing devices 206) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the access management system 110, the compute service manager 112, the execution platform 114, the authentication and identity management system 118 and the devices 870 may include the computing device 206 or any other computing device described herein as being in communication with the network-based data warehouse system 102 or the cloud storage provider system 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 300 and 400 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Examples

Example 1 is a network-based data warehouse system comprising: at least one hardware processor and a memory storing instructions that cause the at least one hardware processor to perform operations comprising: creating, in a database, a storage integration object identifying a storage location in a storage platform of a cloud storage provider system and a cloud identity object, the cloud identity object being associated, at the storage platform of the cloud storage provider, with a proxy identity object granted permission to access the storage location, creating, in the database, an external stage object based on the storage integration object, the external stage object identifying the storage location and including association with the storage integration object; receiving, from a computing device, a command to load or unload data at the storage location; and in response to the command, loading or unloading, via the proxy identity object, the data at the storage location using the external stage object.

In Example 2 the subject matter of Example 1 optionally further comprises: setting usage permissions associated with the integration object; and setting usage permissions associated with the external stage object.

In Example 3, the subject matter of any one of Examples 1 and 2 optionally further comprises: granting a first user permission to use the storage integration object and granting a second user permission to use the external stage object.

In Example 4, the subject matter of any one of Examples 1-3 optionally further comprises: receiving a command to create the storage integration object, the command identifying the storage location and the cloud storage provider system, wherein the creating of the storage integration object is based on the command to create the storage integration object.

In Example 5, the subject matter of any one of Examples 1-4, optionally further comprises receiving a command to create the external stage object, the command comprising an identifier corresponding to the storage location and an identifier corresponding to the integration object.

Example 6 comprises the subject matter of any one of Examples 1-5, wherein the loading or unloading of the data at the storage location optionally comprises: accessing first security credentials for accessing the proxy identity object using second security credentials associated with the cloud identity object; and accessing the proxy identity object using security credentials.

In Example 7, the subject matter of any one of Examples 1-6 optionally further comprises: transmitting, to an access management system of the cloud storage provider system, a request for the first security credentials, the request comprising the second security credentials associated with the cloud identity object.

In Example 8, the subject matter of any one of Examples 1-7 optionally further comprises verifying that the storage location is allowed by the storage integration object based on information included in the storage integration object.

In Example 9, the subject matter of any one of Examples 1-8 optionally further comprises verifying user permissions of a user associated with the command.

In Example 10, the subject matter of any one of Examples 1-9, optionally further comprises verifying that the user has permission to use the storage integration object; and verifying that the user has permission to use the external stage object.

Example 11 comprises the subject matter of any one of Examples 1-10, wherein the storage integration object optionally includes a first identifier corresponding to the storage location; and the external stage object optionally includes a second identifier corresponding to a portion of the storage location.

Example 12 is a method comprising: creating, by one or more hardware processors of a machine, a storage integration object in a database of a network-based data warehouse system, the storage integration object identifying a storage location in a storage platform of the cloud storage provider system and a cloud identity object, the cloud identity object being associated, at the storage platform of the cloud storage provider, with a proxy identity object granted permission to access the storage location; creating, in the database, an external stage object based on the storage integration object, the external stage object identifying the storage location and including association with the storage integration object; receiving, from a computing device, a command to load or unload data at the storage location; and in response to the command, loading or unloading, via the proxy identity object, the data at the storage location using the external stage object.

In Example 13 the subject matter of Example 12 optionally further comprises: setting usage permissions associated with the integration object; and setting usage permissions associated with the external stage object.

In Example 14, the subject matter of any one of Examples 12 and 13 optionally further comprises: granting a first user permission to use the storage integration object and granting a second user permission to use the external stage object.

In Example 15, the subject matter of any one of Examples 12-14 optionally further comprises: receiving a command to create the storage integration object, the command identifying the storage location and the cloud storage provider system, wherein the creating of the storage integration object is based on the command to create the storage integration object.

In Example 16, the subject matter of any one of Examples 12-15, optionally further comprises receiving a command to create the external stage object, the command comprising an identifier corresponding to the storage location and an identifier corresponding to the integration object.

Example 17 comprises the subject matter of any one of Examples 12-16, wherein the loading or unloading of the data at the storage location optionally comprises: accessing the proxy identity object using the security credentials associated with the proxy identity object.

In Example 18, the subject matter of any one of Examples 12-17 optionally further comprises verifying user permissions of a user associated with the command.

In Example 19, the subject matter of any one of Examples 12-18 optionally further comprises verifying that the user has permission to use the storage integration object; or verifying that the user has permission to use the external stage object.

Example 20 is a computer-storage medium comprising instructions that, when executed by a processing device, configure the processing device to perform operations comprising: creating, by one or more hardware processors of a machine, a storage integration object in a database of a network-based data warehouse system, the storage integration object identifying a storage location in a storage platform of the cloud storage provider system and a cloud identity object, the cloud identity object being associated, at the storage platform of the cloud storage provider, with a proxy identity object granted permission to access the storage location; creating, in the database, an external stage object based on the storage integration object, the external stage object identifying the storage location and including association with the storage integration object; receiving, from a computing device, a command to load or unload data at the storage location; and in response to the command, loading or unloading, via the proxy identity object, the data at the storage location using the external stage object.

In Example 21, the subject matter of Example 20 optionally further comprises: setting usage permissions associated with the integration object; and setting usage permissions associated with the external stage object.

In Example 22, the subject matter of any one or more of Examples 20 and 21 optionally further comprises receiving a command to create the storage integration object, the command identifying the storage location and the cloud storage provider system, wherein the creating of the storage integration object is based on the command to create the storage integration object.

In Example 23, the subject matter of any one or more of Examples 20-22 optionally further comprises receiving a command to create the external stage object, the command comprising an identifier corresponding to the storage location and an identifier corresponding to the integration object.

Example 24 comprises the subject matter of any one of Examples 20-23, wherein the loading or unloading of the data at the storage location optionally comprises accessing first security credentials for accessing the proxy identity object using second security credentials associated with the cloud identity object; and accessing the proxy identity object using security credentials.

In Example 25, the subject matter of any one of Examples 20-24, optionally further comprises verifying that the storage location is allowed by the storage integration object based on information included in the storage integration object.

The invention claimed is:

1. A network-based data warehouse system comprising:
at least one hardware processor; and
a memory storing instructions that cause the at least one hardware processor to perform operations comprising:
creating, in a database, a storage integration object identifying a cloud identity object and a storage location in a storage platform of a cloud storage provider system, the cloud identity object corresponding to a cloud identity that is associated, at the storage platform of the cloud storage provider, with a proxy identity object corresponding to a proxy identity granted permission to access the storage location;
creating, in the database, an external stage object based on the storage integration object, the external stage object identifying the storage location and including an association with the storage integration object;
receiving, from a computing device, a command to load or unload data at the storage location; and
in response to the command, loading or unloading, via the proxy identity object, the data at the storage location in the storage platform using the external stage object, the loading or unloading of the data comprising:
identifying the storage integration object based on the external stage object; and
accessing the storage location by causing the cloud identity to assume the proxy identity using security credentials obtained from the cloud storage provider system based on information included in the storage integration object.

2. The network-based data warehouse system of claim 1, wherein the operations further comprise:
setting usage permissions associated with the storage integration object; and
setting usage permissions associated with the external stage object.

3. The network-based data warehouse system of claim 2, wherein:
the setting of the usage permissions associated with the storage integration object comprise granting a first user permission to use the storage integration object; and
the setting of the usage permissions associated with the external stage object comprise granting a second user permission to use the external stage object.

4. The network-based data warehouse system of claim 1, wherein the operations further comprise:
receiving a command to create the storage integration object, the command identifying the storage location and the cloud storage provider system, wherein the creating of the storage integration object is based on the command to create the storage integration object.

5. The network-based data warehouse system of claim 1, wherein the operations further comprise:
receiving a command to create the external stage object, the command comprising an identifier corresponding to the storage location and an identifier corresponding to the storage integration object.

6. The network-based data warehouse system of claim 1, wherein:
the security credentials are first security credentials; and
the loading or unloading of the data at the storage location comprises:
accessing the first security credentials associated with the proxy identity object using second security credentials associated with the cloud identity object; and
accessing the proxy identity object using the first security credentials.

7. The network-based data warehouse system of claim 6, wherein the accessing of the security credentials comprises:
transmitting, to an access management system of the cloud storage provider system, a request for the first security credentials, the request comprising the second security credentials associated with the cloud identity object.

8. The network-based data warehouse system of claim 1, wherein the operations further comprise verifying that the storage location is allowed by the storage integration object based on information included in the storage integration object.

9. The network-based data warehouse system of claim 1, wherein the operations further comprise:
verifying user permissions of a user associated with the command.

10. The network-based data warehouse system of claim 9, wherein the verifying of the user permissions includes one or more of:
verifying that the user has permission to use the storage integration object; or
verifying that the user has permission to use the external stage object.

11. The network-based data warehouse system of claim 1, wherein:
the storage integration object includes a first identifier corresponding to the storage location; and
the external stage object includes a second identifier corresponding to a portion of the storage location.

12. A method comprising:
creating, by one or more hardware processors of a machine, a storage integration object in a database of a database system, the storage integration object identifying a cloud identity object and a storage location in a storage platform of a cloud storage provider system, the cloud identity object corresponding to a cloud identity that is associated, at the storage platform of the cloud storage provider, with a proxy identity object corresponding to a proxy identity granted permission to access the storage location;
creating, in the database, an external stage object based on the storage integration object, the external stage object identifying the storage location and including association with the storage integration object;
receiving, from a computing device, a command to load or unload data at the storage location; and
in response to the command, loading or unloading, via the proxy identity object, the data at the storage location in the storage platform using the external stage object, the loading or unloading of the data comprising:
identifying the storage integration object based on the external stage object; and
accessing the storage location by causing the cloud identity to assume the proxy identity using security credentials obtained from the cloud storage provider system based on information included in the storage integration object.

13. The method of claim 12, further comprising:
setting usage permissions associated with the storage integration object; and
setting usage permissions associated with the external stage object.

14. The method of claim 13, wherein:
the setting of the usage permissions associated with the storage integration object comprise granting a first user permission to use the storage integration object; and
the setting of the usage permissions associated with the external stage object comprise granting a second user permission to use the external stage object.

15. The method of claim 12, further comprising:
receiving a command to create the storage integration object, the command identifying the storage location and the cloud storage provider system, wherein the creating of the storage integration object is based on the command to create the storage integration object.

16. The method of claim 12, further comprising:
receiving a command to create the external stage object, the command comprising an identifier corresponding to the storage location and an identifier corresponding to the storage integration object.

17. The method of claim 12, wherein:
the security credentials are first security credentials; and
the loading or unloading of the data at the storage location comprises:
accessing the first security credentials associated with the proxy identity object using second security credentials associated with the cloud identity object; and
accessing the proxy identity object using the first security credentials associated with the proxy identity object.

18. The method of claim 12, further comprising verifying user permissions of a user associated with the command.

19. The method of claim 18, wherein the verifying of the user permissions includes one or more of:
verifying that the user has permission to use the storage integration object; or
verifying that the user has permission to use the external stage object.

20. A computer-storage medium comprising instructions that, when executed by one or more processors of a machine, configure the machine to perform operations comprising:
creating, by one or more hardware processors of a machine, a storage integration object in a database of a database system, the storage integration object identifying a cloud identity object and storage location in a storage platform of a cloud storage provider system, the cloud identity object corresponding to a cloud identity that is associated, at the storage platform of the cloud storage provider, with a proxy identity object corresponding to a proxy identity granted permission to access the storage location;

creating, in the database, an external stage object based on the storage integration object, the external stage object identifying the storage location and including association with the storage integration object;

receiving, from a computing device, a command to load or unload data at the storage location; and in response to the command, loading or unloading, via the proxy identity object, the data at the storage location in the storage platform using the external stage object, the loading or unloading of the data comprising:
identifying the storage integration object based on the external stage object; and
accessing the storage location by causing the cloud identity to assume the proxy identity using security credentials obtained from the cloud storage provider system based on information included in the storage integration object.

21. The computer-storage medium of claim 20, wherein the instructions configure the machine to perform further operations comprising:
setting usage permissions associated with the storage integration object; and
setting usage permissions associated with the external stage object.

22. The computer-storage medium of claim 20, wherein the instructions configure the machine to perform further operations comprising:
receiving a command to create the storage integration object, the command identifying the storage location and the cloud storage provider system, wherein the creating of the storage integration object is based on the command to create the storage integration object.

23. The computer-storage medium of claim 20, wherein the instructions configure the machine to perform further operations comprising:
receiving a command to create the external stage object, the command comprising an identifier corresponding to the storage location and an identifier corresponding to the storage integration object.

24. The computer-storage medium of claim 20, wherein:
the security credentials are first security credentials; and
the instructions configure the machine to perform further operations comprising:
accessing the first security credentials for accessing the proxy identity object using second security credentials associated with the cloud identity object; and
accessing the proxy identity object using the first security credentials.

25. The computer-storage medium of claim 20, wherein the instructions configure the machine to perform further operations comprising:
verifying that the storage location is allowed by the storage integration object based on information included in the storage integration object.

* * * * *